(12) United States Patent
Veskovic (10) Patent No.: US 12,058,796 B2
(45) Date of Patent: Aug. 6, 2024

(54) LOCATION-BASED CONFIGURATION OF A LOAD CONTROL DEVICE

(71) Applicant: Lutron Technology Company LLC, Coopersburg, PA (US)

(72) Inventor: Dragan Veskovic, Allentown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/182,689

(22) Filed: Mar. 13, 2023

(65) Prior Publication Data

US 2023/0217576 A1 Jul. 6, 2023

Related U.S. Application Data

(63) Continuation of application No. 17/699,532, filed on Mar. 21, 2022, now Pat. No. 11,612,043, which is a continuation of application No. 17/061,712, filed on Oct. 2, 2020, now Pat. No. 11,284,497, which is a continuation of application No. 16/556,344, filed on Aug. 30, 2019, now Pat. No. 10,798,805, which is a continuation of application No. 15/959,355, filed on Apr. 23, 2018, now Pat. No. 10,405,411, which is a continuation of application No. 15/332,395, filed on Oct. 24, 2016, now Pat. No. 10,129,962, which is a continuation of application No. 14/274,109, filed on
(Continued)

(51) Int. Cl.
*H05B 47/18* (2020.01)
*G06K 7/10* (2006.01)
*H05B 45/10* (2020.01)
*H05B 47/10* (2020.01)
*H05B 47/185* (2020.01)

(52) U.S. Cl.
CPC ......... *H05B 47/18* (2020.01); *G06K 7/10297* (2013.01); *H05B 45/10* (2020.01); *H05B 47/10* (2020.01); *H05B 47/185* (2020.01)

(58) Field of Classification Search
CPC ...... H05B 47/185; H05B 47/00; H05B 47/10; H05B 45/10; G06K 7/10297
See application file for complete search history.

(56) References Cited

U.S. PATENT DOCUMENTS

| 5,565,855 A | 10/1996 | Knibbe |
| 5,838,116 A | 11/1998 | Katyl et al. |

(Continued)

*Primary Examiner* — Kam Wan Ma
(74) *Attorney, Agent, or Firm* — Michael S. Czarnecki; Glen R. Farbanish; Philip N. Smith (57) ABSTRACT

A method of automatically programming a new load control device that replaces an old load control device takes advantage of a remote identification tag (e.g., an RFID tag) located in the vicinity of the old device. The remote identification tag stores an identifier that is representative of a location in which the old device is installed. The method includes the steps of: (1) storing a setting of an old device in a memory of a controller; (2) associating the setting with the identifier of the old device in the memory of the controller; (3) the new device retrieving the identifier from the remote identification tag after the new device is installed in the location of the old device; (4) the new device transmitting the identifier to the controller; and (5) the controller transmitting the setting of the old device to the new device in response to receiving the identifier.

19 Claims, 7 Drawing Sheets

Related U.S. Application Data

May 9, 2014, now Pat. No. 9,516,724, which is a continuation of application No. 12/718,273, filed on Mar. 5, 2010, now Pat. No. 8,760,262.

(60) Provisional application No. 61/162,018, filed on Mar. 20, 2009.

(56) References Cited

U.S. PATENT DOCUMENTS

| | | |
|---|---|---|
| 5,962,992 A | 10/1999 | Huang et al. |
| 6,275,681 B1 | 8/2001 | Vega et al. |
| 6,282,407 B1 | 8/2001 | Vega et al. |
| 6,362,738 B1 | 3/2002 | Vega |
| 6,525,648 B1 | 2/2003 | Kubler et al. |
| 6,608,552 B1 | 8/2003 | Fogel et al. |
| 6,667,690 B2 | 12/2003 | Durej et al. |
| 6,674,248 B2 | 1/2004 | Newman et al. |
| 6,803,728 B2 | 10/2004 | Balasubramaniam et al. |
| 6,831,569 B2 | 12/2004 | Wang et al. |
| 6,943,683 B2 | 9/2005 | Perret |
| 6,956,538 B2 | 10/2005 | Moore |
| 6,963,282 B1 | 11/2005 | Yeates et al. |
| 6,983,783 B2 | 1/2006 | Carmen, Jr. et al. |
| 7,154,378 B1 | 12/2006 | Ertas et al. |
| 7,208,887 B2 | 4/2007 | Mosebrook et al. |
| 7,248,165 B2 | 7/2007 | Collins et al. |
| 7,274,291 B2 | 9/2007 | Shaffer et al. |
| 7,295,115 B2 | 11/2007 | Aljadeff et al. |
| 7,369,060 B2 | 5/2008 | Veskovic et al. |
| 7,388,490 B2 | 6/2008 | Freitag et al. |
| 7,391,297 B2 | 6/2008 | Cash et al. |
| 7,529,594 B2 | 5/2009 | Walters et al. |
| 7,548,150 B2 | 6/2009 | Huber et al. |
| 7,619,539 B2 | 11/2009 | Veskovic et al. |
| 7,857,498 B2 | 12/2010 | Smith |
| 8,143,811 B2 | 3/2012 | Shloush et al. |
| 8,260,575 B2 | 9/2012 | Walters et al. |
| 8,364,319 B2 | 1/2013 | Roosli |
| 8,381,981 B2 | 2/2013 | Fowler et al. |
| 8,536,984 B2 | 9/2013 | Hinds et al. |
| 8,760,262 B2 | 6/2014 | Veskovic |
| 9,516,724 B2 | 12/2016 | Veskovic |
| 10,129,962 B2 | 11/2018 | Veskovic |
| 2003/0197625 A1 | 10/2003 | Szuba |
| 2004/0217718 A1 | 11/2004 | Kumar et al. |
| 2005/0156728 A1 | 7/2005 | Nanba |
| 2005/0179404 A1 | 8/2005 | Veskovic |
| 2006/0071790 A1 | 4/2006 | Duron et al. |
| 2006/0109203 A1 | 5/2006 | Huber |
| 2006/0125426 A1 | 6/2006 | Veskovic |
| 2006/0149126 A1 | 7/2006 | Ertas et al. |
| 2006/0193125 A1 | 8/2006 | Fluss |
| 2006/0202851 A1 | 9/2006 | Cash et al. |
| 2007/0014113 A1 | 1/2007 | Von Der Brelie |
| 2007/0057807 A1 | 3/2007 | Walters et al. |
| 2007/0110192 A1 | 5/2007 | Steiner |
| 2007/0121323 A1 | 5/2007 | Pawlik et al. |
| 2007/0228999 A1* | 10/2007 | Kit ............... H05B 45/10 315/291 |
| 2008/0019113 A1 | 1/2008 | Smith |
| 2008/0037241 A1 | 2/2008 | Von Der Brelie |
| 2008/0092075 A1 | 4/2008 | Jacob et al. |
| 2008/0185977 A1 | 8/2008 | Veskovic et al. |
| 2009/0218959 A1 | 9/2009 | Hollander et al. |
| 2009/0273433 A1 | 11/2009 | Rigatti et al. |
| 2010/0090619 A1 | 4/2010 | Adamson et al. |
| 2010/0213876 A1 | 8/2010 | Adamson et al. |
| 2010/0238001 A1 | 9/2010 | Veskovic |
| 2010/0241255 A1 | 9/2010 | Benetz et al. |
| 2010/0304716 A1 | 12/2010 | Hoeksel et al. |
| 2011/0115293 A1 | 5/2011 | Cash et al. |
| 2012/0019365 A1 | 1/2012 | Tuikka et al. |
| 2012/0029816 A1 | 2/2012 | Kato et al. |
| 2012/0056712 A1 | 3/2012 | Knode |
| 2014/0247117 A1 | 9/2014 | Veskovic |
| 2014/0320022 A1 | 10/2014 | Lee |
| 2016/0302276 A1* | 10/2016 | Fushimi ............... H05B 47/185 |
| 2017/0042004 A1* | 2/2017 | Veskovic ............... H05B 47/10 |

\* cited by examiner

LOCATION-BASED CONFIGURATION OF A LOAD CONTROL DEVICE

CROSS-REFERENCE TO RELATED APPLICATIONS

This application is a continuation of commonly-assigned U.S. patent application Ser. No. 17/699,532, filed Mar. 21, 2022; which is a continuation application of commonly-assigned U.S. patent application Ser. No. 17/061,712, filed on Oct. 2, 2020, now U.S. Pat. No. 11,284,497 issued Mar. 22, 2022; which is a continuation of commonly-assigned U.S. patent application Ser. No. 16/556,344, filed on Aug. 30, 2019, now U.S. Pat. No. 10,798,805 issued on Oct. 6, 2020; which is a continuation of commonly-assigned U.S. patent application Ser. No. 15/959,355, filed on Apr. 23, 2018, now U.S. Pat. No. 10,405,411, issued on Sep. 3, 2019; which is a continuation of commonly-assigned U.S. patent application Ser. No. 15/332,395, filed on Oct. 24, 2016, now U.S. Pat. No. 10,129,962, issued Nov. 13, 2018; which is a continuation of commonly-assigned U.S. patent application Ser. No. 14/274,109, filed May 9, 2014, now U.S. Pat. No. 9,516,724, issued Dec. 6, 2016, which is a continuation of commonly-assigned U.S. patent application Ser. No. 12/718,273, filed Mar. 5, 2010, now U.S. Pat. No. 8,760,262, issued Jun. 24, 2014, which is a non-provisional application of commonly-assigned U.S. Provisional Application Ser. No. 61/162,018, filed Mar. 20, 2009, the entire disclosures of which are hereby incorporated by reference.

BACKGROUND OF THE INVENTION

Field of the Invention

The present invention relates to load control systems for controlling the amount of power delivered to one or more electrical loads and, specifically, to a method of automatically programming a new load control device, such as an electronic dimming ballast, using a remote identification tag, such as a radio-frequency identification (RFID) transponder that is associated with the location (e.g., fixture) in which the new load control device is installed.

Description of the Related Art

A typical prior art load control system is operable to control the amount of power delivered to an electrical load, such as a lighting load or a motor load, from an alternating-current (AC) power source. A lighting control system generally comprises a plurality of control devices coupled to a communication link to allow for communication between the control devices. The control devices of a typical lighting control system include lighting control devices (e.g., dimmer circuits or electronic dimming ballasts) operable to control the amount of power delivered to the lighting loads (and thus, the intensity of the lighting loads) in response to digital messages received via the communication link. In addition, the control devices of a typical lighting control system often include one or more keypad devices that transmit commands via the communication link in order to control the loads coupled to the lighting control devices.

Lighting control systems for fluorescent lamps typically comprise a controller and a plurality of electronic dimming ballasts that are operable to communicate via a digital communication link. The controller may communicate with the ballasts using, for example, the industry-standard Digital Addressable Lighting Interface (DALI) communication protocol. The DALI protocol allows each ballast in the lighting control system to be assigned a unique digital address, to be programmed with configuration information (e.g., preset lighting intensities), and to control a fluorescent lamp in response to commands transmitted via the communication link. Some controllers may provide a user interface that allows for control of the lighting control system. The controllers of a lighting control system may comprise, for example, wall-mounted keypads or handheld devices, such as infrared (IR) remote controls, personal digital assistants (PDA). The IR commands are received by an IR receiving sensor that is operable to send appropriate commands to the controlled ballasts. In addition to IR receiving sensors, the lighting control system may also include daylight sensors or occupancy sensors. The daylight and occupancy sensors are operable to monitor the condition (e.g., the ambient light level or motion from an occupant, respectively) of a space and send appropriate commands to the controlled ballasts in response to the sensed conditions in the space.

When the multi-ballast lighting control system is initially installed, each ballast must be configured appropriately. For example, a ballast may be configured to be included in a particular group with other ballasts that are responsive to commands received from a particular IR receiver. That ballast may also be configured to be included in another particular group of ballasts that are responsive to commands received from a particular daylight sensor, or an additional group of ballasts responsive to a particular occupancy sensor. All ballasts within a particular group are operable to be controlled together. In addition, the ballast may be further configured with certain individual operating parameters, such as minimum and maximum light intensity parameters. In order to maintain these configurations, one of the controllers of the multi-ballast lighting control system (e.g., a central processor) is operable to store and update these configurations as needed.

In the event that an existing ballast within the control system fails, the failed ballast must be replaced with a new ballast. The configurations that were associated with the failed ballast must then be reassigned to the new replacement ballast such that the new ballast will operate in the same fashion as the failed ballast had operated. For example, if the failed ballast had been configured to operate in a particular group of ballasts responsive to an occupancy sensor, then the new ballast, once installed in the same location as the failed ballast, must also be configured to operate in the same ballast group responsive to the occupancy sensor.

One prior art method of reconfiguring a new replacement ballast comprises using a hand-held PDA to run a ballast replacement program in which the user enters the unique serial number of the failed ballast and the unique serial number of the new replacement ballast. The PDA can transmit these serial numbers to an IR receiver within the lighting control system. Once these serial numbers are received by the central processor via the communication link, the central processor can update the configurations accordingly such that the new ballast will operate in the same groups and with the same individual operating parameters as the failed ballast. This prior method of reconfiguration is described in greater detail in commonly-assigned U.S. Pat. No. 7,391,297, issued Jun. 24, 2008, entitled HANDHELD PROGRAMMING FOR A LIGHTING CONTROL SYSTEM, the entire disclosure of which is hereby incorporated by reference.

The prior art method of reconfiguration can be tedious as the user must input the serial numbers of both the failed and new ballasts. If many ballasts are to be replaced in the lighting control system, the prior art method becomes even more tedious as more serial numbers must be entered. Thus, there exists a need for a method of automatic ballast replacement and reconfiguration that does not require the user to completely re-program a new ballast or to enter any serial numbers.

SUMMARY OF THE INVENTION

According to the present invention, a method of automatically programming a new load control device that replaces an old load control device of a load control system takes advantage of a remote identification tag located in the vicinity of the old load control device. The remote identification tag stores an identifier that is representative of a location in which the old load control device is installed. The method comprises the steps of: (1) storing a setting of an old load control device in a memory of a controller; (2) associating the identifier with the setting of the old load control device in the memory of the controller; (3) the new load control device retrieving the identifier from the remote identification tag after the new load control device is installed in the location of the old load control device; (4) the new load control device transmitting the identifier to the controller; and (5) the controller transmitting the setting of the old load control device to the new load control device in response to receiving the identifier.

In addition, a load control device for controlling the power delivered from an AC power source to an electrical load is also described herein. The load control device comprises a load control circuit adapted to be coupled between the AC power source and the electrical load, a controller operatively coupled to the load control circuit for controlling the power delivered to the load, a communication circuit adapted to be coupled to a communication link, and an identifier retrieval circuit coupled to the controller. The communication circuit allows the controller to transmit and receive digital messages on the communication link. The identifier retrieval circuit retrieves an identifier from a remote identification tag located in the vicinity of the load control device. The load control device is operable to transmit a digital message including the identifier on the communication link, and to subsequently receive a digital message including a load control setting associated with the identifier. For example, the identifier retrieval circuit may comprise a RFID circuit for retrieving the identifier from an RFID tag located in the vicinity of the load control device. In addition, the load control device may be adapted to be mounted to a fixture in which the remote identification tag is located.

According to another embodiment of the present invention, a load control system comprises a load control device installed in the vicinity of a remote identification tag for storing an identifier and a controller coupled to the load control device via a communication link. The load control device is operable to retrieve the identifier from the remote identification tag. The controller is operable to store in a memory a load control setting, which is associated with the identifier of the remote identification tag. The load control device is operable to transmit the identifier to the controller, and the controller is operable to transmit the load control setting associated with the identifier to the load control device in response to receiving the identifier.

Other features and advantages of the present invention will become apparent from the following description of the invention that refers to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 1:
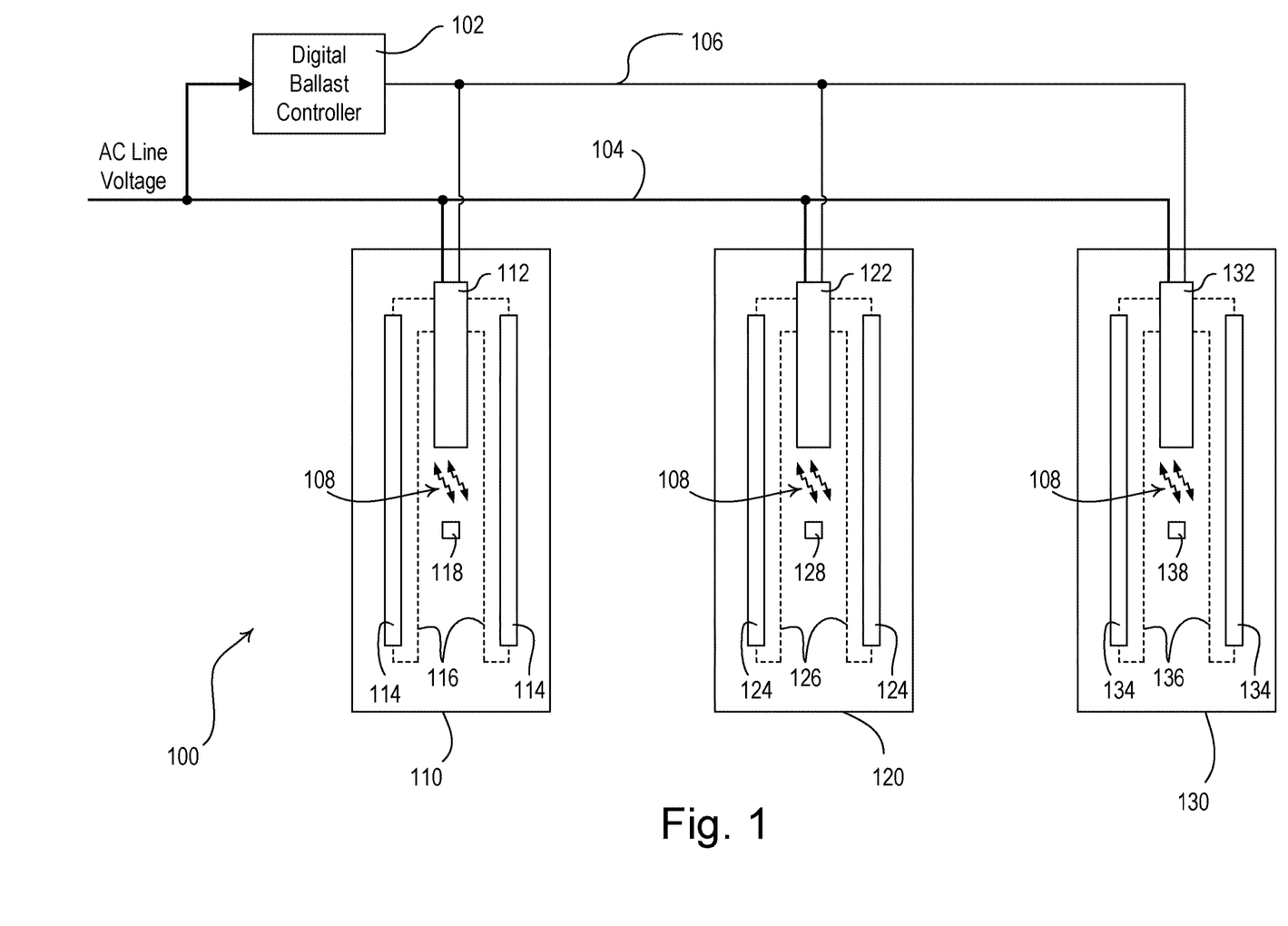
FIG. 1 is a simplified block diagram of a fluorescent lighting control system having a digital ballast controller and a plurality of ballasts for control of the intensity of a plurality of fluorescent lamps according to a first embodiment of the present invention.

FIG. 1 is a simplified block diagram of a fluorescent lighting control system 100 for control of the intensities of a plurality of fluorescent lamps 114, 124, 134 according to a first embodiment of the present invention. The fluorescent lighting control system 100 includes a plurality of lighting fixtures 110, 120, 130 (e.g., three fixtures) in which the lamps 114, 124, 134 are located. Each fixture 110, 120, 130 also includes a respective digital electronic dimming ballast 112, 122, 132 that is coupled to the respective lamp 114, 124, 134 via a lamp wiring 116, 126, 136. The ballasts 112, 122, 132 are each coupled to an alternating-current (AC) power source (not shown) via a line voltage wiring 104 for receiving an AC mains line voltage. The lighting control system 100 further comprises a digital ballast controller 102 that is coupled to each of the ballasts 112, 122, 132 via a digital ballast communication link 106. Accordingly, the ballasts 112, 122, 132 are operable to control the intensities of the lamps 114, 124, 134 in response to digital messages received from the digital ballast controller 102 via the digital ballast communication link 106.

The digital ballast controller 102 also operates as a link power supply. Specifically, the digital ballast controller 102 receives the AC mains line voltage and generates a DC link voltage for the digital ballast communication link 106. The digital ballast controller 102 and ballasts 112, 122, 132 are operable to transmit and receive digital messages via the digital ballast communication link 106 using, for example, the digital addressable lighting interface (DALI) protocol. The digital ballast communication link 106 may be coupled to more ballasts 112, 122, 132, for example, up to 64 ballasts. The ballasts 112, 122, 132 are all assigned a unique serial number (e.g., a 64-bit serial number) during manufacture of the ballast. The serial number is used to identify the ballasts 112, 122, 132 during configuration of the ballasts after the ballasts are installed. The ballasts 112, 122, 132 are then assigned a short address during configuration. Because the short address requires less communication bandwidth than the serial number (e.g., 8 bits), the short address is used to transmit and receive digital messages on the communication link 106, such that the digital message may be transmitted more quickly, thus improving the overall response speed of the lighting control system 100.

During configuration of the lighting control system 100, the ballasts 112, 122, 132 may be assigned the short addresses and may be configured with one or more configuration settings (i.e., load control settings), such as, for example, high-end trims, low-end trims, preset intensities, fade times, and ballast groups. The digital ballast controller 102 is operable to build a database of the short addresses and the configuration settings of the ballasts 112, 122, 132 during the configuration of the lighting control system 100. An example of a configuration procedure for the lighting control system 100 is described in greater detail in commonly-assigned U.S. patent application Ser. No. 11/870,783, filed Oct. 11, 2007, entitled METHOD OF BUILDING A DATABASE OF A LIGHTING CONTROL SYSTEM, the entire disclosure of which is hereby incorporated by reference.

While not shown in FIG. 1, each ballast 112, 122, 132 may also be operable to receive a plurality of inputs from, for example, an occupancy sensor, an infrared (IR) receiver, and a keypad, and to subsequently transmit digital messages or control the intensities of the respective lamp 114, 124, 134 in response. An example of a ballast that is able to be coupled to a communication link and to receive inputs from various sensors and other external devices is described in greater detail in commonly-assigned U.S. Pat. No. 7,369,060, issued May 6, 2008, entitled DISTRIBUTED INTELLIGENCE BALLAST SYSTEM AND EXTENDED LIGHTING CONTROL PROTOCOL, and U.S. Pat. No. 7,619,539, issued Nov. 17, 2009, entitled MULTIPLE-INPUT ELECTRONIC BALLAST WITH PROCESSOR, the entire disclosures of which are hereby incorporated by reference.

The ballasts 112, 122, 132 are each located within the vicinity of a remote identification tag (e.g., a passive RFID tag or transponder 118, 128, 138). As shown in FIG. 1, the RFID tags 118, 128, 138 may be located within the respective lighting fixtures 110, 120, 130. For example, each RFID tags 118, 128, 138 may comprise a label that is permanently affixed to the inside of the respective fixture 110, 120, 130, for example, during initial installation of the fixture, or during installation of the ballast into the fixture. The ballasts 112, 122, 132 are each operable to generate an electronic field that allows radio-frequency (RF) signals 108 (i.e., RFID signals) to be transmitted to power and activate the RFID tags 118, 128, 138. In response to the RFID signals 108, each RFID tag 118, 128, 138 is operable to transmit a unique RFID identifier (i.e., a fixture identifier) to the respective ballast 112, 122, 132. The RFID identifier may be, for example, a 64-bit serial number that is unique to the specific lighting fixture 110, 120, 130 in which the RFID tag 118, 128, 138 is installed. In the event that one of the ballasts 112, 122, 132 fails and a new replacement ballast is installed in its place, the RFID identifier of the RFID tag 118, 128, 138 of the fixture 110, 120, 130 (in which the new ballast is installed) is used by the digital ballast controller 102 to program the newly-installed ballast, as will be described in greater detail below. Alternatively, the ballasts 112, 122, 132 could be mounted to junction boxes (not shown) located outside of the fixtures 110, 120, 130, and the RFID tags 118, 128, 138 could each be mounted to the outside of the fixtures or to the junction boxes (but only within the range of the RF signals 108 generated by the ballasts 112, 122, 132).

Figure 2:
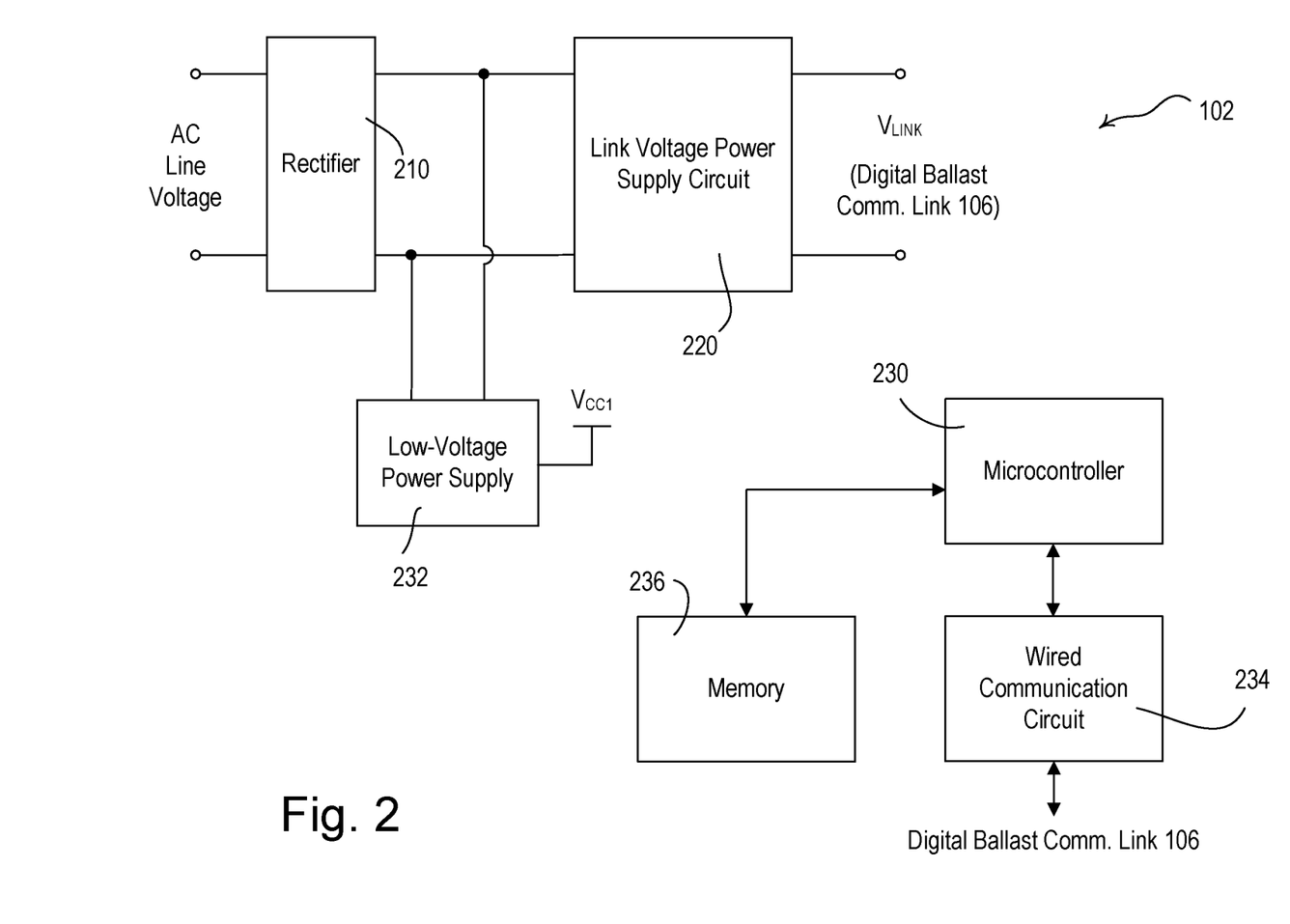
FIG. 2 is a simplified block diagram of the digital ballast controller of the load control system of FIG. 1.

FIG. 2 is a simplified block diagram of the digital ballast controller 102 of the fluorescent lighting control system 100. The digital ballast controller 120 comprises a rectifier 210 for receiving the AC line voltage and for generating a rectified voltage. A link voltage power supply circuit 220 receives the rectified voltage and generates the DC link voltage $V_{LINK}$ (i.e., approximately 18 $V_{DC}$) for the digital ballast communication link 106. A microcontroller 230 is coupled to a memory 236 for storage of the database of addresses and configuration settings, and to a wired communication circuit 234 for transmitting and receiving digital messages on the digital ballast communication link 106. The microcontroller 230 may alternatively comprise, for example, a programmable logic device (PLD), a microprocessor, an application specific integrated circuit (ASIC), or any suitable type of controller or control circuit. A low-voltage power supply 232 is connected across the outputs of the rectifier 210 to provide a DC supply voltage $V_{CC1}$ (e.g., 5 V), which is used to power the microcontroller 230 and other low-voltage circuitry of the digital ballast controller 102.

Figure 3:
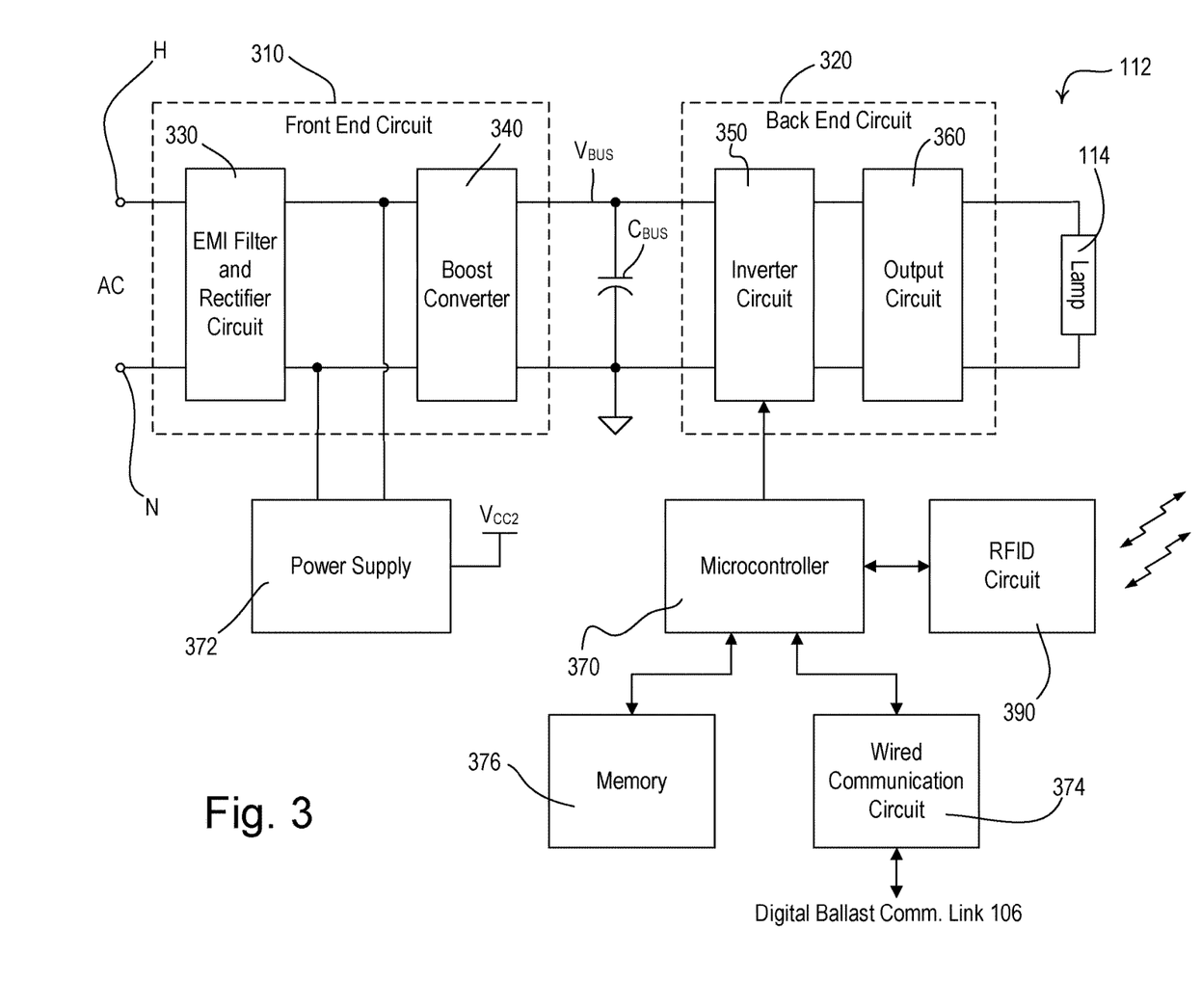
FIG. 3 is a simplified block diagram of one of the digital electronic dimming ballasts of the fluorescent lighting control system of FIG. 1 according to the first embodiment.

FIG. 3 is a simplified block diagram of one of the digital electronic dimming ballasts 112 according to the first embodiment of the present invention. The electronic ballast 112 comprises a hot terminal H and a neutral terminal N for receipt of the AC mains line voltage, and a load control circuit having a front end circuit 310 and a back end circuit 320. The front end circuit 310 includes an EMI (electromagnetic interference) filter and rectifier circuit 330 for minimizing the noise provided on the AC mains (i.e., at the hot terminal H and the neutral terminal N) and for generating a rectified voltage from the AC mains line voltage. The front end circuit 310 further comprises a boost converter 340 for generating a direct-current (DC) bus voltage $V_{BUS}$ across a bus capacitor $C_{BUS}$. The DC bus voltage $V_{BUS}$ typically has a magnitude (e.g., 465 V) that is greater than the peak voltage $V_{PK}$ of the AC mains line voltage (e.g., 170 V). The boost converter 340 also operates as a power-factor correction (PFC) circuit for improving the power factor of the ballast 112. The boost converter 340 may comprise, for example, a PFC integrated circuit (not shown), such as, for example, part number TDA4863 manufactured by Infineon Technologies AG. Alternatively, the ballast 112 may not comprise the boost converter 340, such that the DC bus voltage $V_{BUS}$ has a maximum magnitude equal to approximately the peak voltage $V_{PK}$ of the AC mains line voltage.

The back end circuit 320 includes an inverter circuit 350 for converting the DC bus voltage $V_{BUS}$ to a high-frequency AC voltage. The inverter circuit 350 comprises one or more semiconductor switches, for example, two FETs (not shown), and a ballast control integrated circuit (not shown) for controlling the FETs. The ballast control integrated circuit is operable to selectively render the FETs conductive to control the intensity of the lamps 114. The ballast control integrated circuit may comprise, for example, part number NCP5111 manufactured by On Semiconductor. The back end circuit 320 further includes an output circuit 360 comprising a resonant tank circuit for coupling the high-frequency AC voltage generated by the inverter circuit 350 to the filaments of the lamps 114.

A microcontroller 370 is coupled to the inverter circuit 350 for control of the switching of the FETs to thus turn the lamps 114 on and off and to control (i.e., dim) the intensity of the lamps 114 between a minimum intensity (e.g., 1%) and a maximum intensity (e.g., 100%). The microcontroller 370 may alternatively comprise, for example, a programmable logic device (PLD), a microprocessor, an application specific integrated circuit (ASIC), or any suitable type of controller or control circuit. The ballast 112 further comprises a power supply 372 for generating a supply voltage $V_{CC2}$ (e.g., approximately 5 V) for powering the microcontroller 370 and other low-voltage circuitry of the ballast. A wired communication circuit 374 is coupled to the microcontroller 370 and allows the ballast 112 to communicate with the other ballasts on the digital ballast communication link 106. The microcontroller 370 is further coupled to a memory 376 for storing the ballast serial number, the short address, the RFID identifier, and the other configuration settings. Examples of digital electronic ballasts are described in greater detail in commonly-assigned U.S. Pat. No. 7,489,090, issued Feb. 10, 2009, entitled ELECTRONIC BALLAST HAVING ADAPTIVE FREQUENCY SHIFTING; U.S. Pat. No. 7,528,554, issued May 5, 2009, entitled ELECTRONIC BALLAST HAVING A BOOST CONVERTER WITH AN IMPROVED RANGE OF OUTPUT POWER; and U.S. patent application Ser. No. 11/787,934, filed Apr. 18, 2007, entitled COMMUNICATION CIRCUIT FOR A DIGITAL ELECTRONIC DIMMING BALLAST; the entire disclosures of which are hereby incorporated by reference.

The ballast 112 further comprises an identifier retrieval circuit (e.g., an RFID circuit 390), which is operable to generate the electronic field that allows the RF signals 108 to be transmitted to power and activate the RFID tag 118. The microcontroller 370 is operable to receive the RFID identifier from the RFID tag 118 via the RFID circuit 390. The communication range of the RFID circuit 390 is sized such that only the RFID tag 118 in the fixture 110 in which the ballast 112 is installed is responsive to the RF signals 108 transmitted by the RFID circuit. Examples of RFID circuits are shown and described in greater detail in U.S. Pat. No. 6,282,407, issued Aug. 28, 2001, entitled ACTIVE ELECTROSTATIC TRANSMITTER AND COMMUNICATING SYSTEM, and U.S. Pat. No. 6,362,738, issued Mar. 26, 2002, entitled READER FOR USE IN A RADIO FREQUENCY IDENTIFICATION SYSTEM AND METHOD THEREOF, the entire disclosures of which are hereby incorporated by reference.

After each ballast 112, 122, 132 is assigned a short address during the configuration of the lighting control system 100, the ballasts may be programmed with additional configuration settings, (e.g., high-end trim, low-end trim, preset intensities, fade times, and ballast groups) which are stored in the memory 376 of the ballasts and in a memory 236 of the digital ballast controller 102. During configuration, the ballasts 112, 122, 132 also transmit the RFID identifiers of the respective RFID tags 118, 128, 138 to the digital ballast controller 102, such that the digital ballast controller is operable to correlate the RFID identifiers with the respective short addresses and other configuration settings of each ballast in the memory 236 of the digital ballast controller.

When one of the ballasts 112, 122, 132 is replaced by a new replacement ballast, the new replacement ballast is operable to retrieve the RFID identifier from the respective RFID tag 118, 128, 138 at startup. The digital ballast controller 102 periodically transmits query messages for unaddressed ballasts on the digital ballast communication link 106. In response to the query message, the new replacement ballast (which does not have a short address) transmits a digital message to the digital ballast controller including the RFID identifier from the respective RFID tag 118, 128, 138. The digital ballast controller 102 then assigns the short address that corresponds to the received RFID identifier to the newly-installed ballast. The digital ballast controller 102 further programs the new replacement ballast with the configuration settings associated with the received RFID identifier in the memory 236. Since the RFID tags 118, 128, 138 are permanently affixed to the fixtures 110, 120, 130 and cannot be removed from the fixtures, the RFID tags clearly link the configuration settings of the ballast 112, 122, 132 to each fixture in which the ballast is installed.

Figure 4:
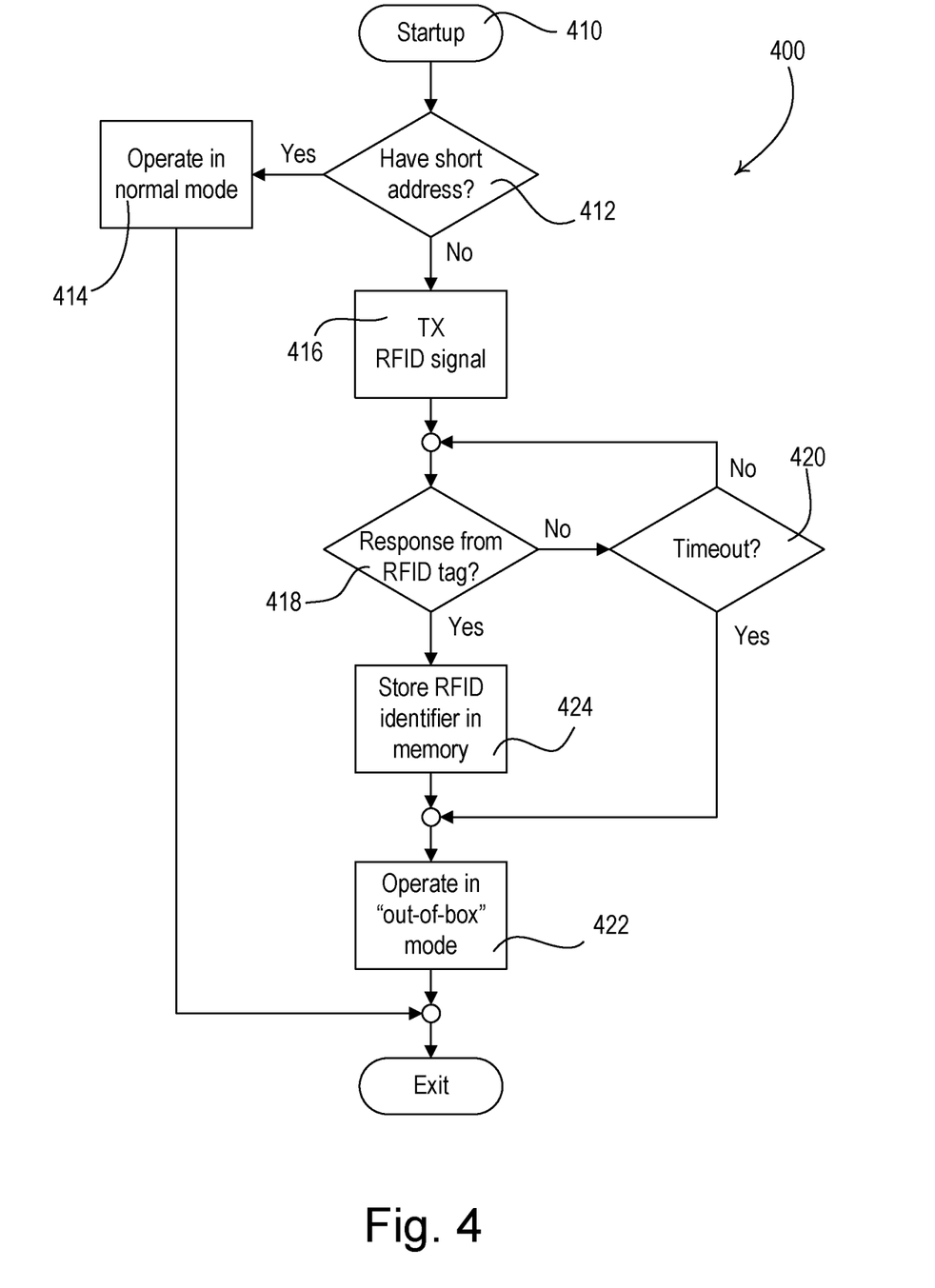
FIG. 4 is a simplified flowchart of a startup procedure executed at startup by each of the ballasts of the fluorescent lighting control system of FIG. 1.

FIG. 4 is a simplified flowchart of a startup procedure 400 that is executed by the microcontroller 370 of each ballast 112, 122, 132 when the controller first starts up (i.e., powers up) at step 410. If the ballast has already been assigned a short address (i.e., there is a short address stored in the memory 376) at step 412, the ballast simply operates in normal mode at step 414 and the startup procedure 400 exits. If the ballast has not been assigned a short address (i.e., the ballast is a replacement ballast) at step 412, the microcontroller 370 causes the RFID circuit 390 to transmit an RFID signal to the respective RFID tag 118, 128, 138 at step 416. The microcontroller 370 then waits until a response is received from the respective RFID tag 118, 128, 138 at step 418 or a timeout (e.g., 100 milliseconds) expires at step 420. If the timeout expires at step 420 before the response is received at step 418, the ballast begins to operate in an "out-of-box" (i.e., a default) mode at step 422 and the startup procedure 400 exits. On the other hand, if a response is received at step 418 before the timeout expires at step 420, the microcontroller 370 stores the received RFID identifier in the memory 376 at step 424 and the ballast operates in the out-of-box mode at step 422, before the startup procedure 400 exits.

Figure 5:
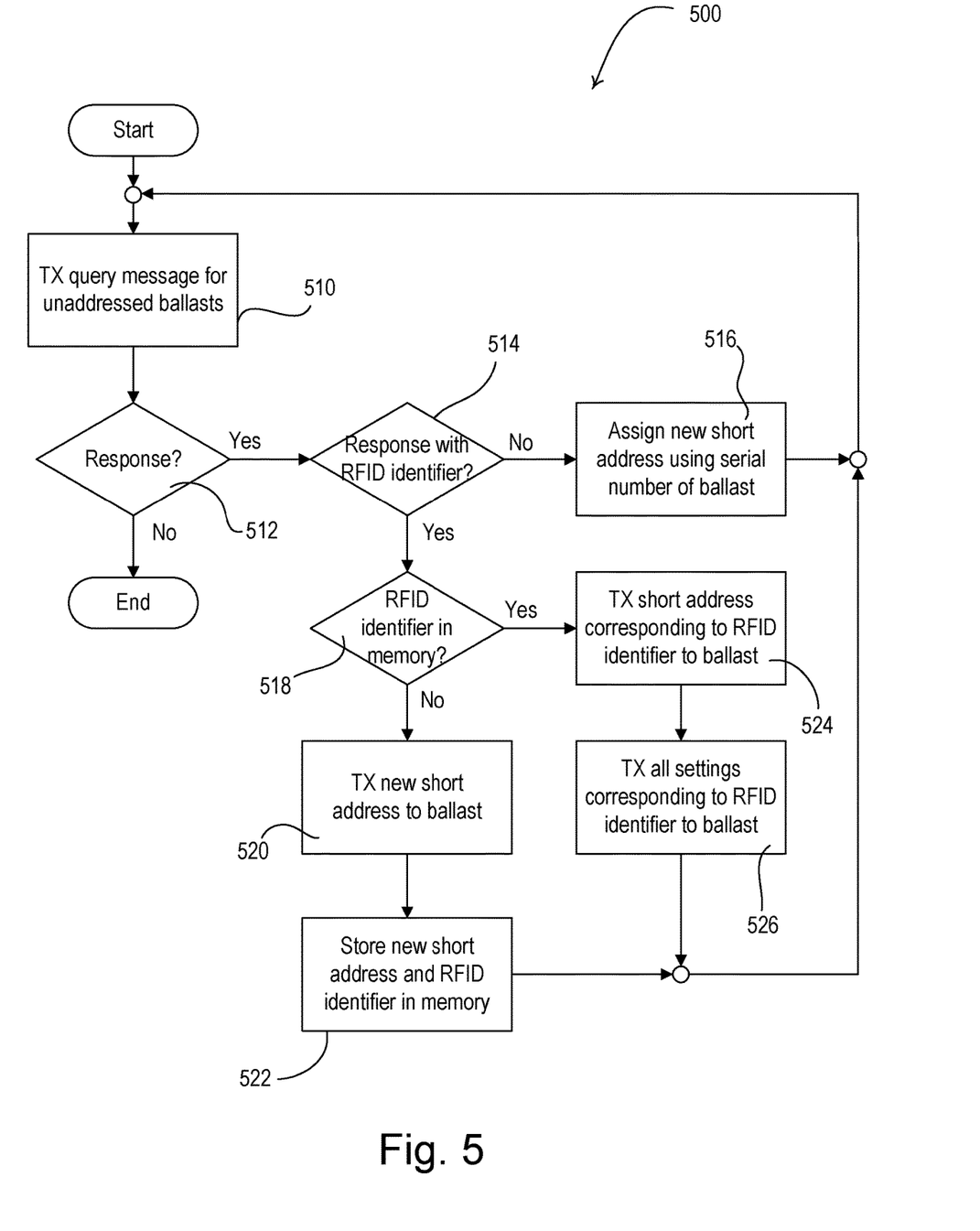
FIG. 5 is a simplified flowchart of an automatic ballast replacement procedure executed by the controller of the fluorescent lighting control system of FIG. 1.

FIG. 5 is a simplified flowchart of an automatic ballast replacement procedure 500 executed periodically (e.g., once every one to five minutes) by the controller 230 of the digital ballast controller 102. The controller 230 first transmits a query message for all unaddressed ballasts on the digital ballast communication link 106 at step 510. If the controller 230 does not receive any responses at step 512, the automatic ballast replacement procedure 500 simply exits. However, if the controller 230 receives a response at step 512, but the response does not contain an RFID identifier at step 514 (i.e., the lighting fixture in which the unaddressed ballast is installed does not include an RFID tag), the controller assigns a new short address to the ballast using the serial number of the ballast at step 516, and then transmits another query message for all unaddressed ballasts on the digital ballast communication link 106 at step 510. For example, at step 516, the controller 230 may use a conventional address assignment procedure as described in previously-referenced U.S. patent application Ser. No. 11/870,783. The controller 230 must ensure that no more than one ballast is assigned each unique short address.

If the response contains an RFID identifier at step 514, but the RFID identifier is not stored in the memory 236 of the digital ballast controller 102 at step 518 (i.e., the lighting fixture in which the addressed ballast is installed is new), the controller 230 transmits a new short address to the ballast at step 520. The controller 230 then stores the received RFID identifier and the new short address in the memory 236 of the digital ballast controller 102 at step 522 and transmits another query message for all unaddressed ballasts on the digital ballast communication link 106 at step 510. If the received RFID identifier is stored in the memory 236 of the digital ballast controller 102 at step 518, the controller 230 transmits the short address that is associated with the RFID identifier in the memory to the responding ballast at step 524. The controller 230 then transmits the configuration settings that are associated with the RFID identifier in the memory 236 to the ballast at step 526 and transmits another query message for all unaddressed ballasts on the digital ballast communication link 106 at step 510. When there are no more unaddressed ballasts at step 512, the automatic ballast replacement procedure 500 exits.

Figure 6:
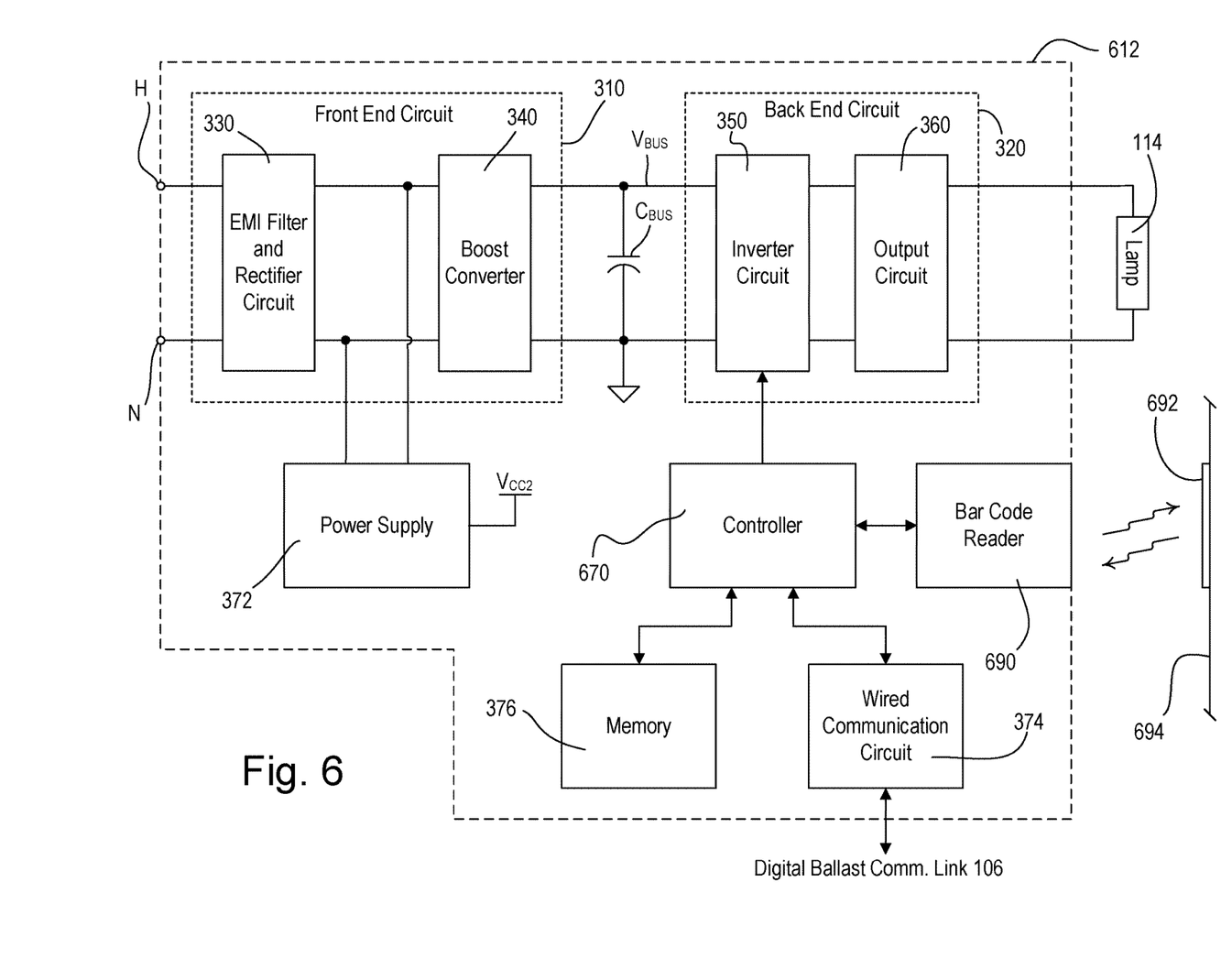
FIG. 6 is a simplified block diagram of an electronic dimming ballast according to a second embodiment of the present invention.

While the present application has been described with reference to the passive RFID tags 118, 128, 138, the concepts of the present invention could also be applied to systems having active RFID tags, for example, powered from the AC line voltage or from a battery. In addition, the RFID tags 118, 128, 138 could alternatively be implemented by other types of remote identification devices, such as, for example, a bar code. FIG. 6 is a simplified block diagram of an electronic dimming ballast 612 having a bar code reader 690 according to a second embodiment of the present invention. The ballast 612 has many similar functional blocks as the ballast 112 of the first embodiment (as shown in FIG. 3). According to the second embodiment, a unique bar code (that serves as a fixture identifier) may be located on the fixture in which the ballast 612 is mounted at a location at which the bar code reader 690 of the ballast can retrieve the fixture identifier from the bar code. For example, the bar code may be located on a label 692 affixed to a sidewall 694 of the fixture, and the ballast 612 may be mounted with the bar code reader immediately adjacent to and directed towards the label 692 having the bar code. At start up, a microcontroller 670 causes the bar code reader 690 to read the bar code to retrieve the fixture identifier, transmits a digital message including the fixture identifier to the digital ballast controller 102, and subsequently receives one or more digital messages including the configuration settings of the ballast 612.

Figure 7:
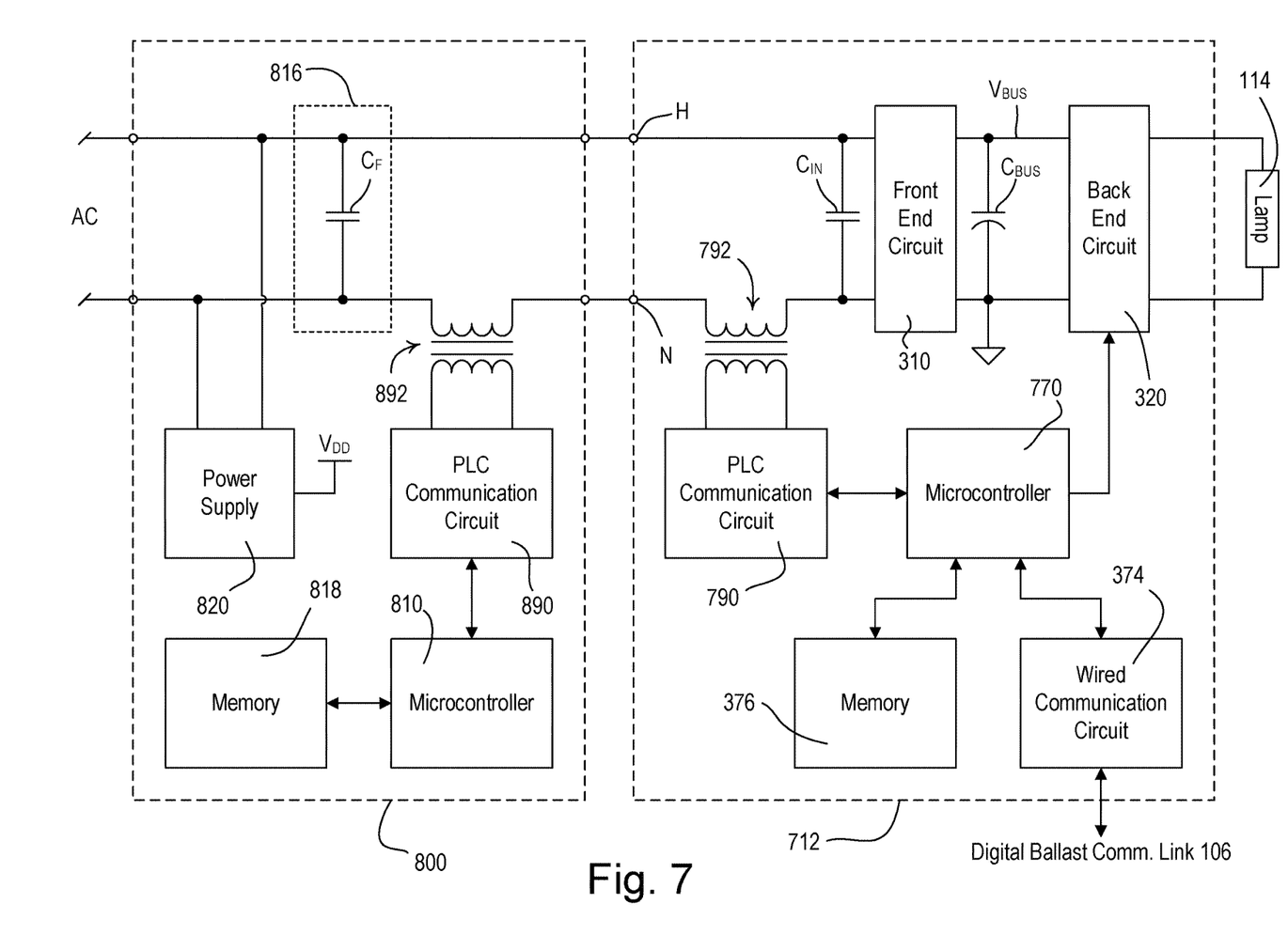
FIG. 7 is a simplified block diagram of an electronic dimming ballast according to a third embodiment of the present invention.

FIG. 7 is a simplified block diagram of an electronic dimming ballast 712 that is operable to retrieve a fixture identifier from a remote identification tag 800 according to a third embodiment of the present invention. The ballast 712 of the third embodiment includes many similar functional blocks as the ballast 112 of the first embodiment (as shown in FIG. 3). The remote identification tag 800 is coupled to the line voltage wiring 104 (FIG. 1) that is connected to the hot and neutral terminals H, N of the ballast 712, such that the remote identification tag is coupled in series between the AC power source and the ballast. Since the remote identification tag 800 remains coupled to the line voltage wiring 104 even when the ballast 712 is removed from the circuit, the remote identification tag is permanently located in the fixture. Accordingly, the remote identification tag 800 clearly links the configuration settings of the ballast 712 to the fixture in which the remote identification tag is installed.

The ballast 712 and the remote identification tag 800 are operable to communicate with each other via the line voltage wiring 104, e.g., using power-line carrier (PLC) communication, to allow for retrieval of the fixture identifier. Specifically, the ballast 712 and the remote identification tag 800 comprise respective microcontrollers 770, 870 and respective PLC communication circuits 790, 890 that are coupled to respective communication transformers 792, 892. In addition, the remote identification tag 800 comprises a filter circuit 894 in the form of a capacitor $C_F$, which is coupled such that a communication loop is formed through the current transformers 792, 892 and an input capacitor $C_{IN}$ (or other capacitance) of the ballast 712. The remote identification tag 800 further comprises a memory 896 for storing the fixture identifier and a power supply 898 for generating a low-voltage supply voltage $V_{DD}$ for powering the microcontroller 870 and other low-voltage circuitry of the remote identification tag. An example of a load control system that includes control devices having communication transformers for PLC communication is described in greater detail in commonly-assigned U.S. patent application Ser. No. 11/447,431, filed Jun. 6, 2006, entitled SYSTEM FOR CONTROL OF LIGHTS AND MOTORS, the entire disclosure of which is hereby incorporated by reference.

The microcontrollers 770, 870 are operable to excite the communication transformers 792, 892 to modulate high-frequency signals onto the line voltage wiring 104 to thus transmit digital messages. Specifically, if the ballast 712 does not have a short address at startup, the microcontroller 770 transmits a digital message including a fixture identifier request to the remote identification tag 800 via the line voltage wiring 104. The microcontroller 870 of the remote identification tag 800 subsequently transmits a digital message including the fixture identifier stored in the memory 896 to the ballast 712. The capacitor $C_F$ prevents digital messages transmitted by the microcontroller 770 of the ballast 712 or the microcontroller 810 of the remote identification tag 800 from being received by any of the other control devices that are also coupled to the AC mains line voltage. In other words, the digital messages transmitted by the ballast 712 are only received by the remote identification tag 800, and the digital messages transmitted by the remote identification tag are only received by the ballast. After retrieving the fixture identifier from the remote identification tag 800, the microcontroller 770 of the ballast 712 is operable to transmit a digital message including the fixture identifier to the digital ballast controller 102 via the digital ballast communication link 106, and to subsequently receive one or more digital messages including the configuration settings from the digital ballast controller.

Accordingly, the present invention provides a fully automatic procedure for replacing an old programmable ballast with a new programmable ballast. As detailed above, the new ballast is automatically programmed with the configuration settings of the old ballast after the new ballast is installed. No additional programming steps or user inputs are required. Since the procedure of the present invention is fully automatic, a person not skilled to perform ballast programming procedures is able to replace the old programmable ballast with the new programmable ballast as if the new ballast were a prior art conventional non-programmable ballast.

While the present invention has been described with reference to the ballasts 112, 612, 712, the concepts of the present invention could be applied to other types of load control devices, such as, for example, light-emitting diode (LED) drivers for LED lighting loads, electronic switches, motor or fan speed control devices, motorized window treatments, or dimmer circuits for other types of lighting loads, such as, incandescent lamps, compact fluorescent lamps, magnetic low-voltage (MLV) lighting loads, and electronic low-voltage (ELV) lighting loads.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of configuring a replacement electrical load device, comprising:
   receiving, by a system controller, a unique identifier stored in a remotely accessible storage device disposed proximate an electrical load device;
   associating, by the system controller, the received unique identifier with a location of the electrical load device;
   associating, by the system controller, the unique identifier with configuration data of the electrical load device;
   causing, by the system controller, a storage of data representative of the unique identifier and the configuration data of the electrical load device in a data structure;
   responsive to replacement of the electrical load device with the replacement electrical load device:
      transferring the data representative of the unique identifier from the remotely accessible storage device to the replacement electrical load device; and
      transferring the data representative of the unique identifier from the replacement electrical load device to the system controller; and
      responsive to receipt of the data representative of the unique identifier from the replacement electrical load device:
         transferring, by the system controller, the stored configuration data of the electrical load device from the data structure to the replacement electrical load device.

2. The method of claim 1 wherein transferring the data representative of the unique identifier from the remotely accessible storage device to the replacement electrical load device further comprises:
   causing, by the replacement electrical load device, an autonomous transfer of the data representative of the unique identifier from the remotely accessible storage device to the replacement electrical load device.

3. The method of claim 2 wherein causing the autonomous transmission of the data representative of the unique identifier from the remotely accessible storage device to the replacement electrical load device, further comprises:
   causing, by the replacement electrical load device, the autonomous transfer of the data representative of the unique identifier from a radio frequency identification (RFID) tag proximate the location of electrical load device to the replacement electrical load device.

4. The method of claim 3 wherein causing the autonomous transmission of the signal that includes the data representative of the unique identifier from the radio frequency identification (RFID) tag proximate the location of electrical load device to the replacement electrical load device, further comprises:
   autonomously communicating, by the replacement electrical load device, an interrogation signal to the radio frequency identification (RFID) tag; and
   receiving by the replacement electrical load device, a signal that includes the data representative of the unique identifier stored in the RFID tag responsive to communication of the interrogation signal.

5. The method of claim 1 wherein transferring the data representative of the unique identifier from the remotely accessible storage device to the replacement electrical load device further comprises:
   causing, by the system controller, the transfer of the data representative of the unique identifier from the remotely accessible storage device to the replacement electrical load device.

6. The method of claim 5:
   wherein the remotely accessible storage device comprises a radio frequency identification (RFID) tag; and
   wherein causing, by the system controller, the transmission of the data representative of the unique identifier from the remotely accessible storage device to the replacement electrical load device, further comprises:
      causing, by the system controller, the replacement electrical load device to transmit an interrogation signal to the radio frequency identification (RFID) tag disposed proximate the electrical load device; and
      receiving, by the replacement electrical load device, a signal that includes the data representative of the unique identifier stored in the RFID tag responsive to the transmission of the interrogation signal by the replacement electrical load device.

7. The method of claim 1 wherein causing, by the system controller, the storage of the unique identifier and the configuration data of the electrical load device in the data structure further comprises:
   causing, by the system controller, the storage of the unique identifier and the configuration data of the electrical load device in a data structure local to the system controller.

8. The method of claim 1 wherein causing, by the system controller, the storage of the unique identifier and the configuration data of the electrical load device in the data structure further comprises:
   causing, by the system controller, the storage of the unique identifier and the configuration data of the electrical load device in a data structure in a network storage device communicatively coupled to the system controller.

9. The method of claim 1, further comprising, prior to receiving the unique identifier stored in the remotely accessible storage device:
   causing, by the system controller, a storage of data representative of the unique identifier in the remotely accessible storage device.

10. A system controller to configure a replacement electrical load device, comprising:
    wireless communication interface circuitry; and
    control circuitry communicatively coupled to the wireless communication circuitry, the control circuitry configured to:
       receive a unique identifier from a remotely accessible storage device disposed proximate an electrical load device;
       associate the received unique identifier with a location of an electrical load device;
       associate the unique identifier with configuration data of the electrical load device;
       cause a storage of the unique identifier and the configuration data in a data structure;
       responsive to replacement of the electrical load device with the replacement electrical load device:

cause a transfer of the data representative of the unique identifier from the remotely accessible storage device to the replacement electrical load device; and responsive to receipt of the data representative of the unique identifier from the replacement electrical load device:

transfer the stored configuration data of the electrical load device from the data structure to the replacement electrical load device.

11. The system controller of claim 10 wherein to cause the transfer of the data representative of the unique identifier from the remotely accessible storage device to the replacement electrical load device, the control circuitry to further:

cause the replacement electrical load device to transmit an interrogation signal to a radio frequency identification (RFID) tag disposed proximate the electrical load device; and cause the replacement electric load device to receive the data representative of the unique identifier stored in the RFID tag responsive to transmission of the interrogation signal by the replacement electrical load device.

12. The system controller of claim 10 wherein to cause the storage of the unique identifier and the configuration data in the data structure, the control circuitry to further:

cause the storage of the unique identifier and the configuration data of the electrical load device in a data structure local to the system controller.

13. The system controller of claim 10 wherein to cause the storage of the unique identifier and the configuration data in the data structure, the control circuitry to further:

cause the storage of the unique identifier and the configuration data of the electrical load device in a data structure in a network storage device communicatively coupled to the system controller.

14. The system controller of claim 10, the control circuitry to further, prior to retrieving the unique identifier from the remotely accessible storage device:

cause the storage of the data representative of the unique identifier in the remotely accessible storage device.

15. A non-transitory, machine-readable, storage device that includes instructions that, when executed by control circuitry in system controller that configures a replacement electrical load device, cause the control circuitry to:

receive a unique identifier from a remotely accessible storage device disposed proximate an electrical load device;

associate the received unique identifier with a location of the electrical load device;

associate the unique identifier with configuration data of the electrical load device;

cause a storage of the unique identifier and the configuration data in a data structure;

responsive to replacement of the electrical load device with the replacement electrical load device:

cause a transfer of the data representative of the unique identifier from the remotely accessible storage device to the replacement electrical load device; and responsive to receipt of the data representative of the unique identifier from the replacement electrical load device:

transfer the stored configuration data of the electrical load device from the data structure to the replacement electrical load device.

16. The non-transitory, machine-readable, storage device of claim 15 wherein the instructions that cause the control circuitry to cause the transfer of the data representative of the unique identifier from the remotely accessible storage device to the replacement electrical load device, further cause the control circuitry to:

cause the replacement electrical load device to transmit an interrogation signal to a radio frequency identification (RFID) tag disposed proximate the electrical load device; and cause the replacement electrical load device to receive the data representative of the unique identifier stored in the RFID tag responsive to transmission of the interrogation signal by the replacement electrical load device.

17. The non-transitory, machine-readable, storage device of claim 15 wherein the instructions that cause the control circuitry to cause the storage of the unique identifier and the configuration data in the data structure, further cause the control circuitry to:

cause the storage of the unique identifier and the configuration data of the electrical load device in a data structure local to the system controller.

18. The non-transitory, machine-readable, storage device of claim 15 wherein the instructions that cause the control circuitry to cause the storage of the unique identifier and the configuration data in the data structure, further cause the control circuitry to:

cause the storage of the unique identifier and the configuration data of the electrical load device in a data structure in a network storage device communicatively coupled to the system controller.

19. The non-transitory, machine-readable, storage device of claim 15 wherein the instructions, when executed by the control circuitry, further cause the control circuitry to, prior to retrieving the unique identifier from the remotely accessible storage device:

cause the storage of the data representative of the unique identifier in the remotely accessible storage device.

* * * * *